United States Patent [19]
Lawson et al.

[11] Patent Number: 5,227,431
[45] Date of Patent: Jul. 13, 1993

[54] DIENE POLYMERS AND COPOLYMERS JUMPED BY PARTIAL CROSSLINKING AND TERMINATED WITH A SUBSTITUTED IMINE

[75] Inventors: David F. Lawson, Uniontown; Mark L. Stayer, Jr., Mogadore; Thomas A. Antkowiak, Rittman; John R. Schreffler, Clinton, all of Ohio

[73] Assignee: Bridgestone/Firestone, Inc., Akron, Ohio

[21] Appl. No.: 684,106

[22] Filed: Apr. 12, 1991

[51] Int. Cl.$^5$ .................. C08L 9/00; C08F 8/30
[52] U.S. Cl. ..................... 525/237; 525/236; 525/314; 525/331.9; 525/332.5; 525/332.9; 525/333.2; 525/362
[58] Field of Search ............ 525/237, 332.9, 314, 525/236, 331.9, 333.2, 332.5, 362

[56] References Cited

U.S. PATENT DOCUMENTS

| | | | |
|---|---|---|---|
| 3,178,398 | 4/1965 | Strobel et al. | 260/85.1 |
| 4,383,085 | 5/1983 | Fujimaki et al. | 525/196 |
| 4,515,922 | 5/1985 | Sakakibara et al. | 525/99 |
| 4,616,069 | 10/1986 | Watanabe et al. | 525/370 |
| 4,677,153 | 6/1987 | Kitahara et al. | 524/552 |
| 4,816,520 | 3/1989 | Bronstert | 525/285 |
| 4,835,209 | 6/1989 | Kitagawa et al. | 524/507 |
| 4,835,216 | 5/1989 | Morikawa et al. | 525/77 |
| 4,845,165 | 6/1989 | Halasa et al. | 525/236 |
| 4,942,197 | 6/1990 | Yoshida et al. | 525/237 |
| 5,109,907 | 5/1992 | Stayer, Jr. et al. | 525/315 |

FOREIGN PATENT DOCUMENTS 0316255 5/1989 European Pat. Off.

Primary Examiner—Paul R. Michl
Assistant Examiner—Olga Asinovsky
Attorney, Agent, or Firm—Frank J. Troy, Sr.

[57] ABSTRACT

Diene polymer or copolymer compositions having reduced hysteresis are provided. The compositions comprise a mixture of diene polymers or copolymers containing carbon-tin bonds in the main polymer or copolymer chains prepared by coupling polymer or copolymer chains with tin polyhalides and diene polymers or copolymer chains containing terminals derived from substituted imines having the formula:

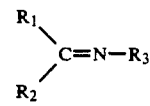

wherein $R_1$ and $R_2$ are selected from the group consisting of H, alkyl, cycloalkyl, aryl, dialkylaminoaryl, aralkyl and aprotic O, N and S- containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups must be a dialkylaminoaryl group and that not all of the $R_1$, $R_2$ and $R_3$ groups must be a dialkylaminoaryl group and that not all of the $R_1$, $R_2$ and $R_3$ groups can be aryl groups. The resultant diene polymer or copolymer compositions have reduced hysteresis and improved processability and can be utilized to form elastomer compositions for tire treads having reduced rolling resistance.

38 Claims, No Drawings

DIENE POLYMERS AND COPOLYMERS JUMPED BY PARTIAL CROSSLINKING AND TERMINATED WITH A SUBSTITUTED IMINE

BACKGROUND OF THE INVENTION

The invention relates to diene polymer or copolymer compositions having reduced hysteresis, a process for their production and to elastomer compositions and tire treads having reduced rolling resistance formed from the compositions. More particularly, the invention relates to diene polymer or copolymer compositions comprising a mixture of diene polymers or copolymers containing carbon-tin bonds in the main polymer or copolymer chains and diene polymers or copolymers containing terminals derived from substituted imines.

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion. Low rolling resistance is desirable from a fuel consumption standpoint while good wet traction is desirable from a safety standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction. The approaches involving modification of the elastomer have generally been based on improving the interaction between the elastomer and the carbon black used in compounding the elastomer to prepare the tire tread composition in order to improve the dispersion of the carbon black into the elastomer. This has the effect of reducing the hysteresis of the tire tread composition which in turn results in low rolling resistance.

One known approach to modifying the diene polymer or copolymer elastomer to reduce the hysteresis of elastomer compositions formed therefrom involves coupling the living diene polymer or copolymer chains with metal halides. Thus, U.S. Pat. Nos. 4,383,085 and 4,515,922 describe the coupling of living diene polymer or copolymer chains obtained by anionic polymerization using an organolithium initiator with metal halides such as tin halides, silicon halides and the like. These patents indicate that tire treads formed from rubber compositions containing the coupled polymers have reduced hysteresis along with reduced rolling resistance and improved wet skid resistance.

Another known approach to modifying the diene polymer or copolymer elastomer to reduce the hysteresis of elastomer compositions involves terminating the living diene polymer or copolymer chains with certain compounds containing functional groups which are reactive with the lithium terminals of the living polymer as illustrated by U.S. Pat. No. 4,835,209 and EPO 0316255. Thus, U.S. Pat. No. 4,835,209 discloses the termination of living diene polymer or copolymer chains with carbodiimides. The patent discloses that rubber compositions containing such polymers have excellent performance characteristics with respect to tensile strength, impact resistance, low heat-generating properties and wear resistance without impairing wet skid properties. EPO 0316255 discloses the termination of living diene polymer or copolymer chains with a capping agent selected from the group consisting of (a) halogenated nitriles having the structural formula X—A—C≡N wherein X is a halogen atom and A is an alkylene group of 1 to 20 carbon atoms, (b) heterocyclic aromatic nitrogen-containing compounds, and (c) alkyl benzoates. This published application discloses that compositions containing such polymers have reduced hysteresis and that tire treads made from such compositions have lower rolling resistance and better traction characteristics.

In addition, diene polymers and copolymers have been terminated or otherwise reacted with compounds containing reactive nitrogen-containing groups including certain substituted imines for various other purposes as illustrated by the following patents:

U.S. Pat. No. 3,178,398 relates to a method of preparing polymers including diene polymers and copolymers having terminal groups containing reactive nitrogen and to the curing of the resultant polymers with polyhalogen-containing compounds. The patent discloses that diene polymers or copolymers containing such terminal groups can be prepared by reacting the living diene polymer or copolymer with a non-polymerizable compound containing the structure

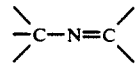

Compounds containing the foregoing structure which are disclosed in the reference include heterocyclic nitrogen compounds, substituted imines and carbodiimides. Substituted imines which are specifically disclosed include N-ethylethylidenimine, N-methylbenzylidenimine, N-hexylcinnamylidenimine, N-decyl-2-ethyl-1,2-diphenylbutylidenimine, N-phenylbenzylidenimine, N-dodecylcyclohexanimine, N-propyl-2,5-cyclohexadienimine, N-methyl-1-naphthalenimine, N,N'-dimethylbutanediimine, N,N'-dipentyl-2-pentene-1,5-diimine, N-nonyl-1,4-naphthoquinonimine, N,N'-diphenyl-1, 4-quinonediimine and N,N'-diphenyl-1,3-indandiimine. The patent indicates that when such polymers are compounded and cured the resultant product has a good balance of physical properties. However, no mention is made of any effect on the hysteresis of the product.

U.S. Pat. No. 4,677,153 relates to a method for modifying a rubber having unsaturated carbon-to-carbon bonds (i.e. double bonds) with (a) an organic compound having a group represented by the formula —CH≡N— and (b) an organic acid halide having a group represented by the formula —COX wherein X is a halogen atom, in the presence of a Lewis acid. Organic compounds having the group represented by the formula —CH≡N— which are disclosed include substituted imines such as, for example, benzylidene methylamine, benzylidene aniline, dimethylaminobenzylidene butylaniline, etc. However, a careful reading of the reference indicates that the unsaturated rubber which is reacted with the (a) and (b) compounds is not a living polymer rubber but rather a previously terminated or "dead" polymer rubber. Thus, it appears clearly evident that the reaction between the unsaturated rubber and these compounds is not at the terminals of the polymer chains of the rubber. The reference teaches that the modified rubber has improved green strength and when vulcanized has improved tensile and rebound resiliency.

U.S. Pat. No. 4,816,520 relates to terminally functionalized polymers, including diene polymers and copolymers, and a process for their preparation. The reference discloses that the terminally functionalized polymers are prepared from living polymers obtained by anionic polymerization of olefinically unsaturated monomers by first reacting the living polymers with the capping reagents comprising various nitrogen compounds including substituted imines (Schiff bases) and diaziridines and then reacting the capped polymer with a terminating agent which contains halogen or acid anhydride groups. Capping reagents which are disclosed include among others a compound of the formula:

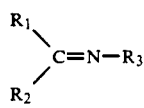

wherein $R_1$ is H, alkyl, cycloalkyl or aryl and $R_2$ and $R_3$ are each alkyl, cycloalkyl or aryl. Terminating agents which are disclosed include halogen compounds such as chloromethylstyrenes, acryloyl chloride, methacryloyl chloride, epichlorohydrin, etc. and acid anhydride compounds such as acrylic anhydride, methacrylic anhydride, maleic anhydride, etc. The reference discloses that the resultant terminally functionalized polymer contains polymerizible end groups which allows for the preparation of graft copolymers.

The use of polymer coupling processes and polymer terminating processes such as those described in certain of the above patents generally results in polymers having reduced hysteresis and rubber compositions containing the coupled or terminated polymers have reduced rolling resistance and good traction properties. However, the use of coupling processes or terminating processes alone also results in certain disadvantages.

Thus, coupling processes which utilize silicon polyhalides such as those described in the above-mentioned patents are known in the prior art to produce polymers of increased molecular weight which, in turn, results in lower hysteresis properties. However, such increases in the molecular weight of the polymers often tend to result in the poor processability of rubber compositions formed by compounding the polymers with carbon black and other conventional rubber additives. Coupling processes which utilize tin polyhalides avoid these processing difficulties by virtue of their known breakdown during compounding, but there are difficulties in obtaining complete substitution with such coupling agents.

On the other hand, polymer terminating processes often require the use of a base polymer of higher molecular weight in order to provide sufficient raw or gum polymer Mooney viscosity for polymer finishing operations. However, the use of higher molecular weight base polymers generally leads to higher compound viscosity which, in turn, leads to processing difficulties in the factory when the terminated polymers are compounded with carbon black and other rubber additives during preparation of the rubber compositions and tire treads formed therefrom. Moreover, the present inventors have found that the higher molecular weight terminated polymer often develops still higher viscosity during the compounding or mixing operations thereby leading to more processing difficulties.

Diene polymer of copolymer elastomers containing a mixture of coupled polymer chains and certain terminally functionalized polymer chains and a method for their preparation are also known in the art. Thus, U.S. Pat. No. 4,616,069 discloses a process for making a diene polymer rubber which comprises reacting an active diene polymer rubber having alkali metal and/or alkaline earth metal terminals, with: (1) a tin compound expressed by the general formula $R_aSnX_b$ (in which R stands for an alkyl, alkenyl, cycloalkyl or aromatic hydrocarbon group; X is a halogen atom, a is an integer of 0–2, and b is an integer of 2–4), and (2) at least one organic compound selected from the group consisting of aminoaldehydes, aminoketones, aminothioaldehydes, aminothioketones and the organic compounds having in their molecules

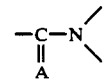

linkages in which A stands for an oxygen or sulfur atom.

Organic compounds containing such linkages which are disclosed include various amide compounds, imide compounds, lactam compounds, urea compounds, carbamic acid derivatives and the corresponding sulfur-containing compounds.

The patent discloses that the order of the reaction with the tin compounds (1) and organic compounds (2) is optional, i.e. they may be performed sequentially by optional order or they may be performed simultaneously. The reference further discloses that the rubber material of the invention shows well-balanced rolling resistance (rebound) and wet skid resistance and also good processability and storage stability.

Diene polymer and copolymer elastomers described in the aforementioned patents possess certain advantages in important properties such as reduced hysteresis (i.e. lower rolling resistance) and good traction and, in certain instances, good processability. However, those skilled in the rubber and tire art continue to seek polymers and rubber compositions having an excellent balance of such properties.

SUMMARY OF THE INVENTION

In accordance with the present invention, diene polymer or copolymer compositions and elastomer compositions having an excellent balance of properties including gum polymer viscosity, compound viscosity and reduced hysteresis, lower rolling resistance and good traction are provided.

The diene polymer or copolymer compositions comprise a mixture of:

a) from about 10 to about 70 percent by weight of a diene polymer or copolymer of a diene monomer and a vinyl aromatic hydrocarbon monomer containing carbon-tin bonds in the main polymer of copolymer chain; and b) from about 90 to about 30 percent by weight of a diene polymer or copolymer of a diene monomer and a vinyl aromatic hydrocarbon monomer containing terminals, formed by reacting living diene polymer or copolymer chains having organoalkali or organoalkaline earth metal terminals with a substituted imine having the formula:

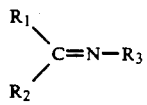

wherein $R_1$ and $R_2$ are selected from the group consisting of H, alkyl, cycloalkyl, aryl, dialkylaminoaryl, aralkyl and aprotic O, N and S-containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups.

The diene polymer or copolymer compositions are prepared by a method which comprises the steps in sequence of:

(1) preparing a living diene polymer or copolymer containing active organoalkali or organoalkaline earth metal terminals by anionically polymerizing a conjugated diene monomer or mixture of a conjugated diene monomer and a vinyl aromatic hydrocarbon monomer in a hydrocarbon solvent using an organoalkali metal or organoalkaline earth metal initiator;

(2) coupling from about 10 to about 70 percent by weight of the living diene polymer or copolymer chains by reacting the organoalkali or organoalkaline earth metal terminals thereof with from about 0.1 to about 0.7 equivalents of a tin polyhalide, based on the number of halogen atoms in said tin polyhalide, per mole of said living diene polymer or copolymer chains, said tin polyhalide having the general formula $R_aSnX_b$, wherein R is selected from the group consisting of alkyl, alkenyl, cycloalkyl and aryl groups, X is a halogen atom, a is an integer of 0-2 and b is an integer of 2-4; and (3) terminating the remaining living diene polymer or copolymer chains by reacting the organoalkali or organoalkaline earth metal terminals thereof with from about 0.3 to about 4 moles of a substituted imine per mole of said diene polymer or copolymer chains, said substituted imine having the formula:

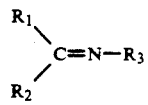

wherein $R_1$, $R_2$ and $R_3$ are as defined above.

Elastomer compositions of the invention may contain: (A) from 30 to 100 percent by weight of said diene polymer or copolymer composition which comprises a mixture of polymer or copolymer containing carbon-tin bonds and polymer or copolymer containing terminals derived from substituted imines and (B) from 0 to 70 percent by weight of a rubber selected from the group consisting of natural rubber, polybutadiene rubber, styrene-butadiene rubber and mixtures thereof.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to coupling and/or terminating reactions.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values are indicative of low hysteresis and, consequently, tires formed from such elastomer compositions have lower rolling resistance.

As indicated above, the diene polymer or copolymer compositions of the invention are prepared by a process which involves first preparing a living diene polymer or copolymer containing active organoalkali or organoalkaline earth metal terminals by anionic polymerization of a conjugated diene monomer or mixture of a conjugated diene monomer and a vinyl aromatic hydrocarbon monomer, coupling a portion of the living diene polymer or copolymer chains by reacting the active terminals thereof with a tin polyhalide (defined below) and then terminating the remaining portion of the living diene polymer or copolymer chains by reacting the active terminals thereof with a substituted imine (defined below).

The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1, 3-butadiene, 2-methyl-1,3-butadiene (isoprene), 2,3-dimethyl-1,3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from about 99 to 20 percent by weight and vinyl aromatic hydrocarbon contents of from about 1 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2- microstructure contents ranging from about 10 to about 80 percent with the preferred polymers of copolymers having 1,2-microstructure contents of from 15 to 65 percent. The preparation of diene polymers of copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerizations", Journal of Polymer Science, Part A-1, Vol. 10, pages 1319-14 1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

As indicated, the diene polymers or copolymers containing carbon-tin bonds in the main polymer or copolymer chains are prepared by coupling the desired amount of living diene polymer or copolymer chains by reacting the alkali or alkaline earth metal terminals thereof with a tin polyhalide having the formula $R_aSnX_b$, wherein R is selected from the group consisting of alkyl, alkenyl, cycloalkyl and aryl groups, X is a halogen atom, a is an integer of 0–2 and b is an integer of 2–4.

Illustrative examples of tin polyhalides which may be employed include methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyltrichlorotin, phenyl trichlorotin, 1-2-bis (trichlorostannyl) ethane, 1,2-bis (methyldichlorostannyl) ethane, 1,4-bis (trichlorostannyl) butane, 1,4-bis (methyldichlorostannyl) ethane and the like. The preferred tin polyhalides are tin tetrachloride and dibutyldichlorotin.

The coupling reaction is conducted by reacting the living polymers, preferably in solution in the hydrocarbon solvent in which they were prepared, with the tin polyhalide coupling agent. The reaction can be carried out if desired by simply adding the coupling agent per se to the polymer solution. However, it is generally preferred to add the coupling agent in the form of a solution thereof in an appropriate solvent for ease of handling.

The amounts of coupling agent added to the living polymer are dependent upon the amounts of live organoalkali metal end groups (e.g. live lithium end groups) present in the living polymer and the amounts of coupled polymer desired in the finished polymer composition. It should be noted that the number of moles of live alkali metal end groups in the living polymer is presumed to be equivalent to the number of moles of alkali metal groups present in the organoalkali metal initiator utilized to effect polymerization. In general, the amount of tin polyhalide coupling agent employed to react with the live alkali metal end groups of the living polymer chains may range about 0.1 to about 0.7 equivalents of tin polyhalide, based on the number of halogen atoms in said tin polyhalide, per mole of living polymer chains. However, preferred amounts of tin polyhalide range from 0.1 to 0.5 equivalents with 0.15 to 0.40 equivalents being especially preferred.

Temperatures employed in coupling the living polymer chains with the coupling agent may vary considerably and are selected with the basic criteria of preserving the live alkali metal end groups of the living polymer chains for reaction with the coupling agent and, subsequently, the terminating agent. Thus, the reaction temperatures may range from about 0° C. to about 100° C. with preferred temperatures ranging from 30° C. to 100° C. and especially preferred temperatures ranging from 50° C. to 80° C. The reaction times may also vary somewhat and are, in general, dependent upon reaction temperatures. Hence, the reaction times may range from about 0.5 minutes to about 60 minutes with preferred reaction times ranging from 1 to 30 minutes.

The diene polymers or copolymers containing terminals derived from substituted imines are prepared by reacting the remaining living polymer or copolymer chains, preferably in solution with a substituted imine or Schiff base compound having the formula:

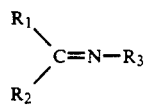

wherein $R_1$ and $R_2$ are selected from the group consisting of H, alkyl, cycloalkyl, aryl, dialkylaminoaryl, aralkyl and aprotic O, N and S- containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups. The alkyl groups in the above formula may contain from 1 to 20 carbon atoms with alkyl groups containing from 1 to 8 carbons being preferred.

It should be noted in regard to the dialkylamino aryl group that the alkyl group of the dialkylamino substituent may be either linear, branched or cyclic in nature. Thus, the dialkylamino substituent may be represented by the formula:

or by the formula:

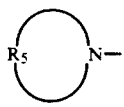

Wherein $R_4$ is an alkyl, cycloalkyl or aralkyl group containing from 1 to 12 carbon atoms and $R_5$ contains from 3 to about 6 methylene groups.

The preferred substituted imines represented by the general formula fall into two classes:

1) Those in which $R_1$ is H and $R_2$ and $R_3$ are aryl groups with at least one of the $R_2$ and $R_3$ groups being a dialkylaminoaryl group.

2) Those in which $R_1$ is H, $R_2$ is alkyl or aralkyl in which the carbon adjacent to the imine carbon is completely substituted with alkyl, aryl or aralkyl groups and $R_3$ is a dialkylaminoaryl group.

Illustrative examples of the $R_2$ groups of the second class include those represented by the formulae:

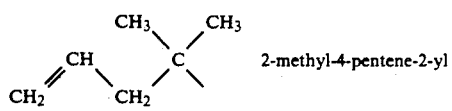 2-methyl-4-pentene-2-yl

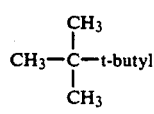 t-butyl

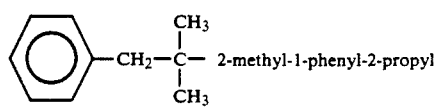 2-methyl-1-phenyl-2-propyl

Illustrative examples of substituted imines which may be employed include dialkylaminobenzylidene alkylamines such as dimethylaminobenzylidene methylamine, dimethylaminobenzylidene ethylamine, dimethylaminobenzylidene butylamine and the like; dialkylaminobenzylidene anilines such as dimethylaminobenzylidene aniline, dimethylaminobenzylidene butylaniline, dimethylaminobenzylidene dodecylaniline and the like; dialkylaminobenzylidene alkoxyanilines such as dimethylaminobenzylidene methoxyaniline, dimethylaminobenzylidene ethoxyaniline and the like; dialkylaminobenzylidene dialkylaminoanilines such as dimethylaminobenzylidene dimethylaminoaniline; benzylidene dialkylaminoanilines such as benzylidene dimethylaminoaniline, benzylidene diethylaminoaniline and the like and alkoxybenzylidene dialkylaminoanilines such as methoxybenzylidene dimethylaminoaniline, methoxybenzylidene diethylaminoaniline and the like and α,α-dialkylalkylidine dialkylaminoanilines.

Particularly, preferred substituted imines for use in preparing the terminally functionalized polymers of the invention are dimethylaminobenzylidene aniline, dimethylaminobenzylidene butylaniline, benzylidene dimethylaminoaniline, dimethylaminobenzylidene methoxyaniline, methoxybenzylidene dimethylaminoaniline, dimethylaminobenzylidene dodecylaniline and 2-methylpent-4-en-2-yl methylidene p-dimethylaminoaniline.

The reaction of the living polymer in solution with the substituted imine terminating agent can be conducted if desired by simply adding the terminating agent per se to the polymer solution. However, it is generally preferred to add the terminating agent in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of imine-terminated polymer desired in the finished polymer composition. It will be noted that the number of moles of live alkali metal end groups in the living polymer is presumed to be equivalent to the number of moles of alkali metal groups present in the organoalkali metal initiator utilized to effect polymerization. In general, the amount of substituted imine terminating agent employed to react with the live alkali metal groups of the living polymer chains may range from about 0.3 to about 4.0 moles of said terminating agent per mole of living polymer chains. However, the preferred amounts range from 0.4 to 1.25 moles of such terminating agent per mole of living polymer chains.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with the preferred temperatures ranging from 30° C. to 100° C. and especially preferred temperatures ranging from 50° C. to 80° C. The reaction times may also vary considerably and are, in general, dependent upon reaction temperatures. Hence, the reaction times may range from about 15 minutes to about 24 hours.

After the terminating reaction is complete, it is generally desirable to quench the polymer mixture in order to deactivate any live alkali metal end groups (e.g. lithium end groups) which may remain. This serves to prevent the living polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant diene polymer or copolymer composition which contains a mixture of polymer containing carbon-tin bonds and polymer containing terminals derived from substituted imines may be recovered from the polymer solution and dried using conventional procedures. Thus, for example, the polymer mixture can be recovered from solution by coagulation either by adding a sufficient volume of a non-solvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The diene polymer or copolymer compositions of the invention may contain from about 10 to about 70 percent by weight of polymer or copolymer containing carbon-tin bonds and corresponding from about 90 to about 30 percent by weight of polymer or copolymer containing terminals derived from substituted imines. However, the preferred compositions are those containing from about 15 to about 40 percent by weight of polymer or copolymer containing carbon-tin bonds and from about 50 to about 85 percent by weight or polymer or copolymer containing terminals derived from substituted imines.

It should be noted here that during the polymerization of the monomer(s) to prepare the living diene polymer or copolymers a minor proportion of living ends may be terminated with hydrogen particularly in instances where the polymerization is conducted at high temperatures. Hence, the polymer compositions may contain minor proportions of such terminated polymers in addition to the diene polymers or copolymers of the invention.

As indicated, the elastomer compositions of the invention may contain (A) from 30 to 100 percent by weight of diene polymer or copolymer composition mixture consisting of diene polymer or copolymer containing carbon-tin bonds and diene polymer or copolymer containing terminals derived from substituted imines and (B) from 0 to 70 percent by weight of a rubber selected from the group consisting of natural rubber, polyisoprene, polybutadiene rubber, styrene-butadiene rubber or mixtures thereof. Such compositions can be prepared by compounding or mixing said diene polymer of copolymer composition component optionally with the other rubber component along with carbon black and other conventional rubber additives such as fillers, plasticizers, antioxidants, curing agents and the like using standard rubber mixing equipment and procedures. Such elastomer compositions when vulcanized using conventional rubber vulcanization conditions have reduced hysteresis properties and are particularly adapted for use as tread rubbers for tires having reduced rolling resistance.

The following examples are submitted for the purpose of further illustrating the nature of the present invention and should not be regarded as a limitation on the scope thereof. Parts and percentages shown in the examples are by weight unless otherwise indicated.

EXAMPLE 1

This example illustrates the preparation of diene copolymer compositions and tread rubber compounds of the invention.

A) Preparation of Living Random Copolymer of Butadiene/Styrene

A "living" medium vinyl butadiene/styrene copolymer was prepared in accordance with the following procedure:

To a stainless steel 5 gallon reactor equipped with a stirrer and thermometer and maintained under a nitrogen atmosphere was charged 0.68 lb (2.96 moles) of styrene, 2.72 lbs (22.88 moles) of 1,3-butadiene, 25.1 lbs of hexane, 8.1 millimoles (hereinafter abbreviated as mM) of N,N,N',N'-tetramethylethylene diamine (TMEDA) and 12.3 mM of n-butyllithium initiator. After addition of the ingredients was completed, the temperature of the reaction mixture was raised to 43° C. for about 3.5 hours with stirring under positive nitrogen pressure. A sample of the resultant living copolymer was quenched with isopropanol and drum dried to serve as a control (designated $C_1$ for convenience) for the copolymer of Example 1. For comparative purposes, a sample of copolymer coupled with tin polyhalide and terminated with isopropanol and a sample of copolymer terminated using a substituted imine were prepared to serve as additional controls (designated $C_2$ and $C_3$ for convenience).

B) Preparation of Copolymer Composition Containing Mixture of Coupled and Terminated Copolymers The living copolymer prepared in step (A) was sampled from the pressurized reactor through a needle into 28 ounce glass bottles with 0.3 equivalent (per equivalent of lithium) of the coupling agent, $SnCl_4$, added as a 1.08 normal solution in hexane and the bottle contents were agitated and heated for 0.5 hours at 50° C. Then, 0.6 equivalents of the terminating agent (p-dimethylamino) benzylidiene aniline (hereafter abbreviated as DMABA) added as a 0.25 molar solution in toluene, was charged to the bottles and the contents were agitated with heating at 50° C. for an additional 2 hour period. Thus, a total of 0.9 equivalents of combined reagents were utilized. The resultant copolymer solution was removed from the bottles, quenched with isopropanol, treated with an antioxidant, coagulated in isopropanol and then drum dried. Types and amount of reagents employed are shown in Table I.

TABLE I

| | Coupling Agent | | Terminating Agent | |
|---|---|---|---|---|
| Example | Type | Amount (meq/mMLi) | Type | Amount (meq/mMLi) |
| $C_1$ | — | — | Isopropanol | — |
| $C_2$ | $SnCl_4$ | 0.9 | Isopropanol | — |
| $C_3$ | — | — | DMABA | 0.9 |
| 1 | $SnCl_4$ | 0.3 | DMABA | 0.6 |

The control copolymer, $C_1$, was analyzed by GPC, HNMR and DSC to determine molecular weight (Mw and Mn), molecular weight distribution (Mw/Mn), vinyl content (1,2-content), styrene content and glass transition temperature (Tg). Results were as follows:

HSGPC(THF): Mn=151,963. Mw=170,200. Mw/Mn=1.12.

NMR: Styrene=23.2%.

Vinyl Content=64.4% (based on butadiene=100).
Tg=−28.1° C.

C) Preparation of Tread Rubber Compounds

Prior to compounding, samples of the above copolymers were tested for Mooney Viscosity (ML/4/100° C.) in the raw or gum state, hereinafter referred to as Mooney Viscosity (gum). Samples of the copolymers were then compounded with carbon black and conventional rubber additives using a standard tread rubber formulation. The standard tread rubber compound had the following formulation:

|  | Parts by Weight |
|---|---|
| Copolymer | 100.0 |
| Carbon Black | 55.0 |
| Process Oil | 10.0 |
| Zinc Oxide | 3.0 |
| Stearic Acid | 2.0 |
| Antioxidant | 1.0 |
| Wax | 2.0 |
| Sulfur | 1.5 |
| Accelerator | 1.0 |

The rubber compounds were mixed using conventional rubber mixing equipment and procedures. Samples of the resultant tread rubber compounds were tested for Mooney Viscosity (ML/4/100° C.), hereinafter Mooney Viscosity (cpd). Samples of tread rubber compounds were cured as 1.5"×4"×0.040" plagues for 35 minutes at 149° C. and tested for hysteresis (Tan delta) properties. Tan delta (hereinafter Tan δ) was conducted at 50° C. using a Dynastat machine operating at a frequency of 1 Herz and 7% strain. Tan δ is a measure of the ratio of the loss modulus of the compound to the storage modules and generally, as indicated above, the lower the value of Tan δ, the lower the hysteresis of the compound. Tests and test results are shown in Table II.

TABLE II

| Copolymer Ex. | $C_1$ | $C_2$ | $C_3$ | 1 |
|---|---|---|---|---|
| Coupling Agent | — | $SnCl_4$ | — | $SnCl_4$ |
| Terminator | Isopropanol | Isopropanol | DMABA | DMABA |
| Mooney Viscosity (ML/4/100° C.) (gum) | 39.7 | 71 | 42 | 86 |
| Compound Properties |  |  |  |  |
| Mooney Viscosity (ML/4/100° C. cpd) | 70.4 | 83.5 | 87.9 | 91.8 |
| Tan δ, 50° C. | .1583 | .1294 | .0844 | .0948 |
| % Δ, Tan δ* | — | −18.3 | −46.7 | −37.8 |
| Stress-Strain, R.T. |  |  |  |  |
| 300% Modulus, psi | 1972 | 2234 | 2566 | 2258 |
| Tensile strength, psi | 2995 | 3074 | 3362 | 3302 |
| Elongation at Break, % | 480 | 442 | 421 | 459 |

*% change in Tan δ: minus values indicate reduction in Tan δ

These results shown greatly reduced tangent delta, indicative of reduced hysteresis, in the polymer of Example 1 when compared with Example $C_1$, where there was no functional end group termination or coupling. Moreover, the hysteresis of Example 1 is lower than that of Example $C_2$, which features only coupling through tin. Although compound ML/4 of Example $C_3$, featuring only termination with Schiff base, is slightly lower than that of Example 1, the polymer of Example $C_3$ has a much lower raw viscosity (i.e., about 42 ML/4) which renders its finishing somewhat more difficult. Although it is possible to terminate a higher molecular weight living polymer with Schiff base to obtain a more readily finishable elastomer than Example $C_3$, other experiments have shown that such an elastomer will develop still higher viscosity during mixing, making it less desirable from a processing standpoint. These examples show that the use of partial coupling in combination with the Schiff base terminator is especially effective for achieving a desirable balance of high raw viscosity, moderate compound viscosity and low hysteresis.

EXAMPLE 2

This example further illustrates the preparation of the diene copolymer compositions and tread rubber compound of the invention.

A) Preparation of Living Random Copolymer of Butadiene/Styrene

A "living" medium vinyl butadiene/styrene copolymer was prepared in accordance with the following procedure:

To a stainless steel 5 gallon reactor equipped with stirrer and thermometer and maintained under a nitrogen atmosphere was charged 409 grams (3.93 moles) of styrene, 1,707 grams (31.61 moles) of 1,3-butadiene, 11,492 grams of hexane, 8.0 mM of 2,2-bis (2-oxolanyl) propane modifier and 16.7 mM of n-butyllithium initiator. After addition of the ingredients was completed, the temperature of the reaction mixture was controlled at 30–50° C. for 5 hours with stirring under positive nitrogen pressure. A sample of the resultant living copolymer was quenched with isopropanol and drum dried to serve as a control (designated $C_4$ for convenience) for the copolymers of Example 2. In addition, a sample of the living copolymer was terminated using a substituted imine to serve as a secondary control (designated $C_5$ for convenience).

B) Preparation of Copolymer Composition Containing Mixture of Coupled and Terminated Copolymers The living copolymer prepared in step (A) was treated in the pressurized reactor with 0.3 equivalent (per equivalent of lithium) of the coupling agent, $SnCl_4$, added as a 1.08 Normal solution in hexane, and the reactor contents were agitated and heated for 0.5 hours at 50° C. Then, 0.7 equivalents of the terminating agent, DMABA, added as a 0.25 molar solution in toluene, was charged to the reactor and the contents were agitated with heating at 50° C. for an additional 2 hour period. Thus, a total of 1 equivalent of combined reagents were utilized. The resultant copolymer solution was removed from the reactor, quenched with isopropanol, treated with an antioxidant, coagulated in isopropanol, and then drum dried. Types and amounts of reagents employed are shown in Table III.

TABLE III

| | Coupling Agent | | Terminating Agent | |
|---|---|---|---|---|
| Example | Type | Amount (meq/mMLi) | Type | Amount (meq/mMLi) |
| $C_4$ | — | — | Isopropanol | — |
| $C_5$ | — | — | DMABA | 1.0 |
| 2 | $SnCl_4$ | 0.3 | DMABA | 0.7 |

The control copolymer, $C_4$, was analyzed by GPC, HNMR and DSC to determine molecular weight (Mw and Mn), molecular weight distribution (Mw/Mn), vinyl content (1,2-content), styrene content and glass transition temperature (Tg).

Results were as follows:
Mn = 146,001.
Mw = 160,600.
Mw/Mn = 1.10.
Tg = −38.9° C.
Vinyl content = 55.5% (based on butadiene = 100).
Styrene = 20.3%.

Samples of the above copolymers were tested for Mooney Viscosity, ML/4/100° C., in the gum state. Additional samples of the above copolymers were then compounded with carbon black and conventional rubber additives using the standard tread rubber formation of Example 1. The compounds were mixed, cured and tested for stress-strain and hysteresis properties in accordance with the procedure of Example 1. Tests and test results are shown in Table IV.

TABLE IV

| Copolymer Ex. | $C_4$ | $C_5$ | 2 |
|---|---|---|---|
| Coupling Agent | — | — | $SnCl_4$ |
| Terminator | Isopropanol | DMABA | DMABA |
| Mooney Viscosity, ML/4/100° C. (gum) | 20.5 | 24.5 | 46.5 |
| Compound Properties | | | |
| Tan δ, 50° C. | .1864 | .0896 | .0803 |
| % Δ, Tan δ* | — | −51.9 | −56.9 |
| Stress-Strain. R.T. | | | |
| 300% modulus, psi | 1649 | 2257 | 2250 |
| Tensile strength, psi | 2714 | 3142 | 3235 |
| Elongation at Break, % | 512 | 429 | 442 |

*% change in Tan δ: minus values indicate reduction in Tan δ

The above data indicate that the copolymer of Example 2 which is partially coupled with $SnCl_4$ and terminated with DMABA has a desirable gum viscosity. The copolymer also showed good processability upon mixing and sheeting to prepare the test specimens. In addition, the copolymer of Example 2 when compounded and cured exhibited lower hysteresis as indicated by Tan δ results than the compounded copolymers of control examples $C_4$ and $C_5$.

EXAMPLES 3–

In these examples, additional copolymers of the invention partially coupled with tin polyhalides and terminated by reaction with substituted imines were prepared. For comparative purposes, a copolymer terminated with isopropanol and a copolymer coupled with tin polyhalide and terminated with isopropanol were prepared to serve as controls (designated $C_6$ and $C_7$ for convenience). The copolymers were prepared substantially in accordance with the procedures of steps (A) and (B) of Example 2. Types and amounts of treating agents are shown in Table V.

TABLE V

| | Coupling Agent | | Terminator | |
|---|---|---|---|---|
| Example | Type | Amount (meq/mMLi) | Type | Amount (meq/mMLi) |
| $C_6$ | — | — | Isopropanol | — |
| $C_7$ | $SnCl_4$ | 1.0 | Isopropanol | — |
| 3 | $SnCl_4$ | 0.3 | $DMABBA^2$ | 0.7 |
| 4 | $Bu_2SnCl_2^1$ | 0.3 | DMABBA | 0.7 |

$^1Bu_2SnCl_2$ is dibutyldichlorotin
$^2$DMABBA is dimethylaminobenzylidene butylaniline The control copolymer, $C_6$, was analyzed as described above. Results were as follows:
Mn = 140,563.
Mw = 158,588.
Mw/Mn = 1.13.
Tg = −35.2° C.
Vinyl Content = 59.6% (based on butadiene = 100).
Styrene = 21.6%.

The copolymers were then tested for gum Mooney Viscosity, compounded using the standard tread rubber formulation and tested for various properties as in Example I. Tests and test results are shown in Table VII.

TABLE VI

| Copolymer Ex. | $C_6$ | $C_7$ | 3 | 4 |
|---|---|---|---|---|
| Coupling Agent | — | $SnCl_4$ | $SnCl_4$ | $Bu_2SnCl_2$ |
| Terminator | Isopropanol | Isopropanol | DMABBA | DMABBA |
| Mooney Viscosity (ML/4/100° C.) (gum) | 30.1 | 101 | 65 | 73.5 |
| Compound Properties | | | | |
| Mooney Viscosity (ML/4/100° C.) (Compound) | 62 | 89 | 89 | 83 |
| Tan δ, 50° C. | 0.1774 | 0.0848 | 0.0796 | 0.0806 |
| % Δ Tan δ | — | −52 | −55 | −55 |

EXAMPLES 5–6

In these examples, additional copolymers of the invention were prepared substantially in accordance with the procedure of Example 2. For comparative purposes, a copolymer terminated with isopropanol and a copolymer coupled with $SnCl_4$ and terminated with isopropanol were prepared to serve as controls ($C_8$ and $C_9$). Types and amounts of treating agents are shown in Table VII.

TABLE VII

| | Coupling Agent | | Coupling Agent | |
|---|---|---|---|---|
| Example | Type | Amount (meq/mMLi) | Type | Amount (meq/mMLi) |
| $C_8$ | — | — | Isopropanol | — |
| $C_9$ | $SnCl_4$ | 1.0 | Isopropanol | — |
| 5 | $SnCl_4$ | 0.35 | DMABBA | 0.65 |
| 6 | $Bu_2SnCl_2$ | 0.35 | DMABBA | 0.65 |

The control copolymer, $C_8$, was analyzed with the following results:
Mn = 114,278.
Mw = 125,371.
Mw/Mn = 1.10.
Tg = −40.4° C.
Vinyl content = 54.1% (based on butadiene = 100).
Styrene = 20.1%.

The copolymers were then tested for gum Mooney Viscosity compounded using the standard tread rubber formulation and tested for various properties as in Examples 1–4. Tests and test results are shown in Table VIII.

TABLE VIII

| Copolymer Ex. | C8 | C9 | 5 | 6 |
| --- | --- | --- | --- | --- |
| Coupling Agent | — | SnCl4 | SnCl4 | Bu2SnCl2 |
| Terminator | Isopropanol | Isopropanol | DMABBA | DMABBA |
| Mooney Viscosity (ML/4/100° C.) (gum) | 15.2 | 86 | 38 | 41.5 |
| Compound Properties | | | | |
| Mooney Viscosity (ML/4/100° C.) (Compound) | 41 | 73 | 65 | 63 |
| Tan δ, 50° C. | 0.2119 | 0.0888 | 0.0831 | .0891 |
| % Δ, Tan δ | — | −58 | −61 | −58 |

We claim:

1. A method for preparing a diene polymer or copolymer having improved processability and adapted to form elastomer compositions having reduced hysteresis properties comprising the steps in sequence of:
   (a) preparing a living diene polymer or copolymer containing active organoalkali or organoalkaline earth metal terminals by anionically polymerizing a conjugated diene monomer or mixture of a conjugated diene monomer and vinyl aromatic hydrocarbon monomer in a hydrocarbon solvent using an organoalkali metal or organoalkaline earth metal initiator;
   (b) coupling from about 10 to about 70 percent by weight of the living diene polymer or copolymer chains by reacting the organoalkali or organoalkaline earth metal terminals thereof with from about 0.1 to about 0.7 equivalents of a tin polyhalide, based on the number of halogen atoms in said tin polyhalide, per mole of said living diene polymer or copolymer chains, said tin polyhalide having the general formula $R_aSnX_b$, wherein R is selected from the group consisting of alkyl, alkenyl, cycloalkyl and aryl groups, X is a halogen atom, a is an integer of 0–2 and b is an integer of 2–4; and
   (c) terminating the remaining living diene polymer or copolymer chains by reacting the organoalkali or organoalkaline earth metal terminals thereof with from about 0.3 to about 4 moles of a substituted imine per mole of said diene polymer or copolymer chains, said substituted imine having the formula:

$$\begin{array}{c} R_1 \\ \phantom{R_1}\diagdown \\ \phantom{R_1R_1}C{=}N{-}R_3 \\ \phantom{R_1}\diagup \\ R_2 \end{array}$$

wherein $R_1$ and $R_2$ are selected from the group consisting of H, alkyl, cycloalkyl, aryl, dialkylaminoaryl, aralkyl and aprotic O, N and S-containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups.

2. The method of claim 1 wherein said living diene polymer or copolymer is a living polymer of butadiene or a copolymer of butadiene and styrene.

3. The method of claim 1 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

4. The method of claim 1 wherein said tin polyhalide is tin tetrachloride.

5. The method of claim 1 wherein said tin polyhalide is dibutyldichlorotin.

6. The method of claim 1 wherein said substituted imine is selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and α,α-dialkylalkylidene dialkylaminoanilines.

7. The method of claim 1 wherein said substituted imine is dimethylaminobenzylidene aniline.

8. The method of claim 1 wherein said substituted imine is dimethylaminobenzylidene butylaniline.

9. A diene polymer of copolymer composition comprising a mixture of:
   (a) from about 10 to about 70 percent by weight of a diene polymer or copolymer of a diene monomer and a vinyl aromatic hydrocarbon monomer containing carbon-tin bonds in the main polymer or copolymer chain; and
   (b) from about 90 to about 30 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with a substituted imine having the formula:

$$\begin{array}{c} R_1 \\ \phantom{R_1}\diagdown \\ \phantom{R_1R_1}C{=}N{-}R_3 \\ \phantom{R_1}\diagup \\ R_2 \end{array}$$

wherein $R_1$ and $R_2$ are selected from the group consisting of H, alkyl, cycloalkyl, aryl, dialkylaminoaryl, aralkyl and aprotic O, N and S-containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups.

10. The composition of claim 9 wherein said diene polymer is polybutadiene.

11. The composition of claim 9 wherein said copolymer is a copolymer of butadiene and styrene.

12. The composition of claim 9 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_aSnX_b$, wherein R is selected from the group consisting of alkyl, alkenyl, cycloalkyl and aryl groups, X is a halogen atom, a is an integer of 0-2 and b is an integer of 2-4.

13. The composition of claim 12 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichloro 1,2-bis (trichlorostannyl) ethane, 1,2-bis (methyldichlorostannyl) ethane, 1,4-bis (trichlorostannyl) butane and 1,4-bis (methyldichlorostannyl) butane.

14. The composition of claim 12 wherein said tin polyhalide is tin tetrachloride.

15. The composition of claim 12 wherein said tin polyhalide is dibutyldichlorotin.

16. The composition of claim 9 wherein said substituted imine is selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and α,α-dialkylalkylidene dialkylaminoanilines.

17. The composition of claim 9 wherein said substituted imine is dimethylaminobenzylidene aniline.

18. The composition of claim 9 wherein said substituted imine is dimethylaminobenzylidene butylaniline.

19. An elastomer composition adapted for use in forming treads of tires having reduced rolling resistance comprising:
(A) from 30-100 percent by weight of a diene polymer or copolymer composition which comprises a mixture of:
  (a) from about 10 to about 70 percent by weight of a diene polymer or copolymer of a diene monomer and a vinyl aromatic hydrocarbon monomer containing carbon-tin bonds in the main polymer or copolymer chain; and
  (b) from about 90 to about 30 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with a substituted imine having the formula:

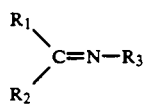

wherein $R_1$ and $R_2$ are selected from the group consisting of H, alkyl, cycloalkyl, aryl, dialkylaminoaryl, aralkyl and aprotic O, N and S-containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups; and
(B) from 0-70 percent by weight of a rubber selected from the group consisting of natural rubber, polybutadiene rubber, styrene-butadiene rubber and mixtures thereof.

20. The elastomer composition of claim 19 wherein the diene polymer of component (A) is polybutadiene.

21. The elastomer composition of claim 19 wherein the diene copolymer of component (A) is a copolymer of butadiene and styrene.

22. The composition of claim 19 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_aSnX_b$, wherein R is selected from the group consisting of alkyl, alkenyl, cycloalkyl and aryl groups, X is a halogen atom, a is an integer of 0-2 and b is an integer of 2-4.

23. The composition of claim 22 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methylchlorostannyl) ethane, 1,4-bis (trichlorostannyl) butane and 1,4-bis (methyldichlorostannyl) butane.

24. The composition of claim 22 wherein said tin polyhalide is tin tetrachloride.

25. The composition of claim 22 wherein said tin polyhalide is dibutyldichlorotin.

26. The composition of claim 22 wherein said substituted imine is selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and α,α-dialkylaminoanilines.

27. The composition of claim 22 wherein said substituted imine is dimethylaminobenzylidene aniline.

28. The composition of claim 22 wherein said substituted imine is dimethylaminobenzylidene butylaniline.

29. A tire having reduced rolling resistance in which the tread portion is formed from an elastomer composition comprising:
(A) from 30-100 percent by weight of a diene polymer or copolymer composition which comprises a mixture of:
  (a) from about 10 to about 70 percent by weight of a diene polymer or copolymer of a diene monomer and a vinyl aromatic hydrocarbon monomer containing tin-carbon bonds in the main polymer or copolymer chain; and
  (b) from about 90 to about 30 percent by weight of a diene polymer or copolymer of a diene monomer and a vinyl aromatic containing terminals formed by reacting living diene polymer or copolymer chains having organoalkali or organoalkaline earth metal terminals with a substituted imine having the formula:

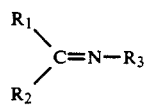

wherein $R_1$ and $R_2$ are selected from the group consisting of H, alkyl, cycloalkyl, aryl, dialkylaminoaryl, aralkyl and aprotic O, N and S-containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S- containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups; and (B) from 0-70 percent by weight of a rubber selected from the group consisting of natural rubber, polybutadiene rubber, styrene-butadiene rubber and mixtures thereof.

30. The tire of claim 29 wherein the diene polymer of component (A) is polybutadiene.

31. The tire of claim 29 wherein the diene copolymer of component (A) is a copolymer of butadiene and styrene.

32. The tire of claim 29 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_a SnX_b$, wherein $R_3$ is selected from the group consisting of alkyl, alkenyl, cycloalkyl and aryl groups, X is a halogen atom, a is an integer of 0-2 and b is an integer of 2-4.

33. The tire of claim 32 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, tin tetrabromide, tin tetraiodide, cyclohexyl trichlorotin, phenyl trichlorotin, 1,2-bis (trichlorostannyl) ethane, 1,2-bis (methylchlorostannyl) ethane, 1,4-bis (trichlorostannyl) butane and 1,4-bis (methyldichlorostannyl) butane..

34. The tire of claim 32 wherein said tin polyhalide is tin tetrachloride.

35. The tire of claim 32 wherein said tin polyhalide is dibutyldichlorotin.

36. The tire of claim 29 wherein said substituted imine is selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and $\alpha,\alpha$-dialkylalkylidene dialkylaminoanilines.

37. The tire of claim 29 wherein said substituted imine is dimethylaminobenzylidene aniline.

38. The tire of claim 29 wherein said substituted imine is dimethylaminobenzylidene butylaniline.

* * * * *

UNITED STATES PATENT AND TRADEMARK OFFICE
CERTIFICATE OF CORRECTION

PATENT NO. : 5,227,431
DATED : 7/13/93
INVENTOR(S) : David F. Lawson, et al.

It is certified that error appears in the above-indentified patent and that said Letters Patent is hereby corrected as shown below:

Column 1, line 31, "polyhalide, per mole" should read --polyhalide, based on the number of halogen atoms in said tin polyhalide,--.

Column 19, line 19, "phenyl trichloro" should read --phenyl trichlorotin--.

Column 20, line 48, "α,α-dialk-ylaminoanilines." should read "α,α-dialkylalkylidene.--.

Column 22, line 3, "$R_3$" should read --R--.

Signed and Sealed this

Seventh Day of June, 1994

Attest:

BRUCE LEHMAN

Attesting Officer      Commissioner of Patents and Trademarks